US006735541B2

(12) United States Patent
Kern et al.

(10) Patent No.: US 6,735,541 B2
(45) Date of Patent: May 11, 2004

(54) PROCESS UNIT MONITORING PROGRAM

(75) Inventors: Kenneth C. Kern, deceased, late of St. Leonard, MD (US), by Steven Kern, executor; George P. Charles, Glen Mills, PA (US); Christopher F. Sullivan, Alexandria, VA (US); Andrew D. Sullivan, Billings, MT (US); Howard H. Shiel, Oakton, VA (US); John M. Righi, London (GB); Michael A. Hayes, Warrenton, VA (US); Daniel H. Mason, Falls Church, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 132 days.

(21) Appl. No.: 10/071,372

(22) Filed: Feb. 8, 2002

(65) Prior Publication Data
US 2002/0116079 A1 Aug. 22, 2002

Related U.S. Application Data

(60) Provisional application No. 60/269,231, filed on Feb. 16, 2001.

(51) Int. Cl.$^7$ .......................... G06F 19/00; G06F 11/00
(52) U.S. Cl. .................. 702/84; 423/210; 423/239.1; 702/47; 702/185

(58) Field of Search ................... 702/23, 30, 34, 702/84, 185, 186; 703/13; 709/103; 700/28, 32, 45, 51, 108, 266; 714/20, 26; 423/210, 239.1

(56) References Cited

U.S. PATENT DOCUMENTS

| 5,107,441 A | * | 4/1992 | Decker .................. 702/47 |
| 5,488,561 A | * | 1/1996 | Berkowitz et al. ........... 700/45 |
| 5,838,920 A | | 11/1998 | Rosborough ........... 395/200.54 |
| 5,864,483 A | | 1/1999 | Brichta .................. 364/468.16 |
| 5,961,596 A | | 10/1999 | Takubo et al. ............. 709/224 |
| 6,101,447 A | | 8/2000 | Poe, Jr. .................. 702/13 |
| 6,505,145 B1 | * | 1/2003 | Bjornson ................. 702/185 |

* cited by examiner

Primary Examiner—John Barlow
Assistant Examiner—John Le
(74) Attorney, Agent, or Firm—Ronald D. Hantman (57) ABSTRACT

The present invention is a method to monitor and analyze the performance of a hydrocarbon-processing unit such as pipestill or hydrocracker unit. The invention includes the steps of collecting historical data relating to the hydrocarbon processing unit, from a process history database, validating the historical data, correcting the data performing a workup to determine the output measurements for the hydrocarbon processing unit, and storing the results of the workup in the process history database.

23 Claims, 4 Drawing Sheets

Advanced Unit Monitoring Toolset Algorithm

PROCESS UNIT MONITORING PROGRAM

CROSS-REFERENCE TO RELATED APPLICATION

Non-Provisional Application based on Provisional Application No. 60/269,231 filed on Feb. 16, 2001, which is based on Patent Memorandum 2000 CL89

BACKGROUND OF THE INVENTION

The present invention relates to determining the output performance of a process unit in an oil refinery. Such units include pipestills, hydrocracking units, catalytic cracking units, hydroprocessing units, and reforming units. In particular, the present invention relates to a new and advanced process unit monitoring computer software (called "unit monitoring toolset") for specific process units.

A Unit Monitoring Toolset is an advanced monitoring computer software capability developed for specific process units that makes use of intelligent, automatic data collection, workup calculations, selective execution of process models to monitor and predict performance and provide input to assessments, reports, etc. The Toolset enables close monitoring, problem diagnosis, model tuning and assists in optimum operation identification, to the extent that the models themselves are capable of identifying these optimum operations. By bringing this to the contact engineer/unit engineer level, we are able to monitor the unit to the extent that best performance should be a daily event.

Current Monitoring Technology relies on monitoring plant measurements (flows, temperatures, etc.) and often comparing them to targets. The fundamental question of "what is happening within an individual process unit" is more complex than that described by such measurements. The Toolset provides process unit information for the user, rather than just measurements. Information comes from detailed calculations, analyses, data workup and the execution of simple or highly complex models which can simulate expected performance. Information like this provides an order of magnitude improvement in the ability to monitor a process unit.

The objectives of a Unit Monitoring Toolset include the following:

Provide state of the art monitoring capability;
Increase the frequency and sophistication at which model-based monitoring is performed;
Use detailed and often design-only models for routine unit monitoring and improvement;
Establish a means to automatically capture high quality data regarding process unit performance in a history database;
Perform calculations and/or run models and store key results in a database to provide a history of operating comparisons from which to use as a knowledge base for future operations;
Diagnose emerging problems sooner;
Replace or retire numerous standalone tools by consolidating them;
Provide better data interchange between analysis tools and components; and
Interact with/exploit desktop computing, engineering tools, and vendor plant information systems.

SUMMARY OF THE INVENTION

The present invention (hereinafter referred to as "unit monitoring toolset") is a method to monitor and analyze the performance of a hydrocarbon-processing unit such as a pipestill or hydrocracker unit. The method may also be used to monitor and analyze the performance of other refinery units including distillation units, hydrotreating units, catalytic cracking units, lubricating oil units and reforming units. For distillation units, the analysis uses equations that relate to the blending of feeds or different crude types, calculations of flash zone performance, hydraulic performance of tower sections, and hydrotreating. For hydrotreating units, the analysis uses equations that relate to catalyst performance and activation, and hydrogen purity. For catalytic cracking units, the analysis uses equations that relate to bed fluidization, catalyst circulation, catalyst additions, cracking estimations, emissions and regeneration. For lubricating oil units, the analysis uses equations that relate to extract and raffinate efficiency, composition impacts of qualities such as wax, additive use, and performance limits that impact qualities. For reforming units, the analysis uses equations that relate to catalyst performance, recycle gas quantity and quality, and regeneration effectiveness.

The invention includes the steps of collecting historical data relating to the hydrocarbon processing unit, from a process history database, validating the historical data, correcting the data, performing a workup to determine the output measurements for the hydrocarbon processing unit, and storing the results of the workup in the process history database. In a preferred embodiment, the historical data and the results of the workup are put into a process unit model for the oil refinery unit to determine an expected performance and potentially also an optimal performance.

Figure 1:
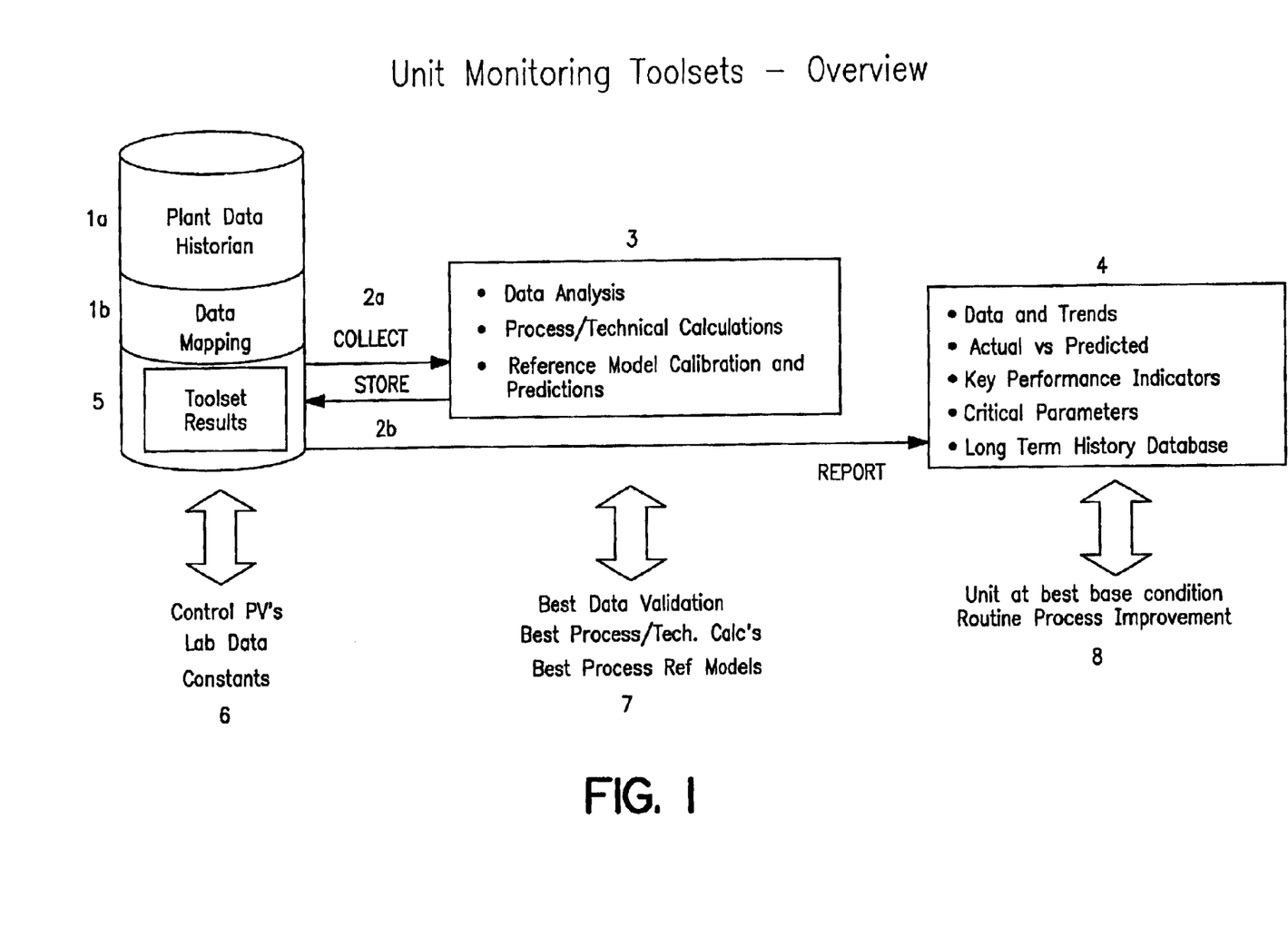
FIG. 1 shows an overview of the present invention.

The unit monitoring toolset has the following algorithm, shown in the overview FIG. 1, which includes the following steps:

1. Collecting data (as shown in FIG. 1, Step 2a) from the process history computer system (FIG. 1, Step 1a). In this regard, data refers to process instrument measurements, laboratory data, manually entered data, operational switches and stored constants for the unit. The collection is an intelligent matching of information from various sources and is a novel approach resulting in higher quality information.
2. Validating the data (FIG. 1, Step 3) by a set of logical rules (such as min/max checking, non-null and confidence checks, and other logical data validation rules such as increasing temperature boiling curves, etc.). This validation assures that the performance analysis is done on good data.
3. Performing a data workup (FIG. 1, Step 4), including a set of calculations that represent the sum total of all the experience of the process and operations experts in the organization for analyzing the operation of that unit. This calculation set yields many results which are all indicators of performance. The data workup varies for every type of process unit. Each Toolset workup is envisioned to be a distinct entity that can be installed, configured, upgraded or operated independently for each type of process unit. Toolset workups may share some underlying utilities or calculation modules, but since each process is fundamentally different, each Toolset workup will be unique.
4. Storing these workup results back into the same process history computer system (FIG. 1, Step 2b) where the original operating data was collected.

The toolset may also include the additional steps:

5. Collecting and inputting the data into a sophisticated process model that can be run to predict the expected operation of that unit (FIG. 1, part of step 3). This model contains the best technology from the organization or available commercially for that process. The models are often fundamental kinetic or molecular models but can also be correlation-based and are custom to the process unit. The models often require tuning, validation and customization to the unit being monitored. Calibration and tuning is often included as a part of the Toolset and may require independent calibration runs of the model in addition to the normal monitoring prediction runs. These models can also include anticipated or planned future operations as a part of the model prediction (for example, catalyst replacement planning requires anticipated future operations estimates).

6. Storing these model results back into the same process history computer system (FIG. 1, Step 2b) where the original operating data was collected.

7. Developing an effective set of reports and alerts (FIG. 1, Step 4) for monitoring (for example, hourly, daily, and weekly reports and exception reports for various people—plant operator, plant process engineer, central engineering expert, etc.).

The overall control of the entire process is achieved through the global attribute mapping (FIG. 1, Step 1b) kept in the Data Reference Attribute Table. This novel table holds the mapping and transposition master information that identifies how information is collected, transposed and moved throughout the various modules of the Toolset in a way that enables it to be automated and applicable to a wide variety of unit designs.

DESCRIPTION OF THE PREFERRED EMBODIMENT

Figure 2:
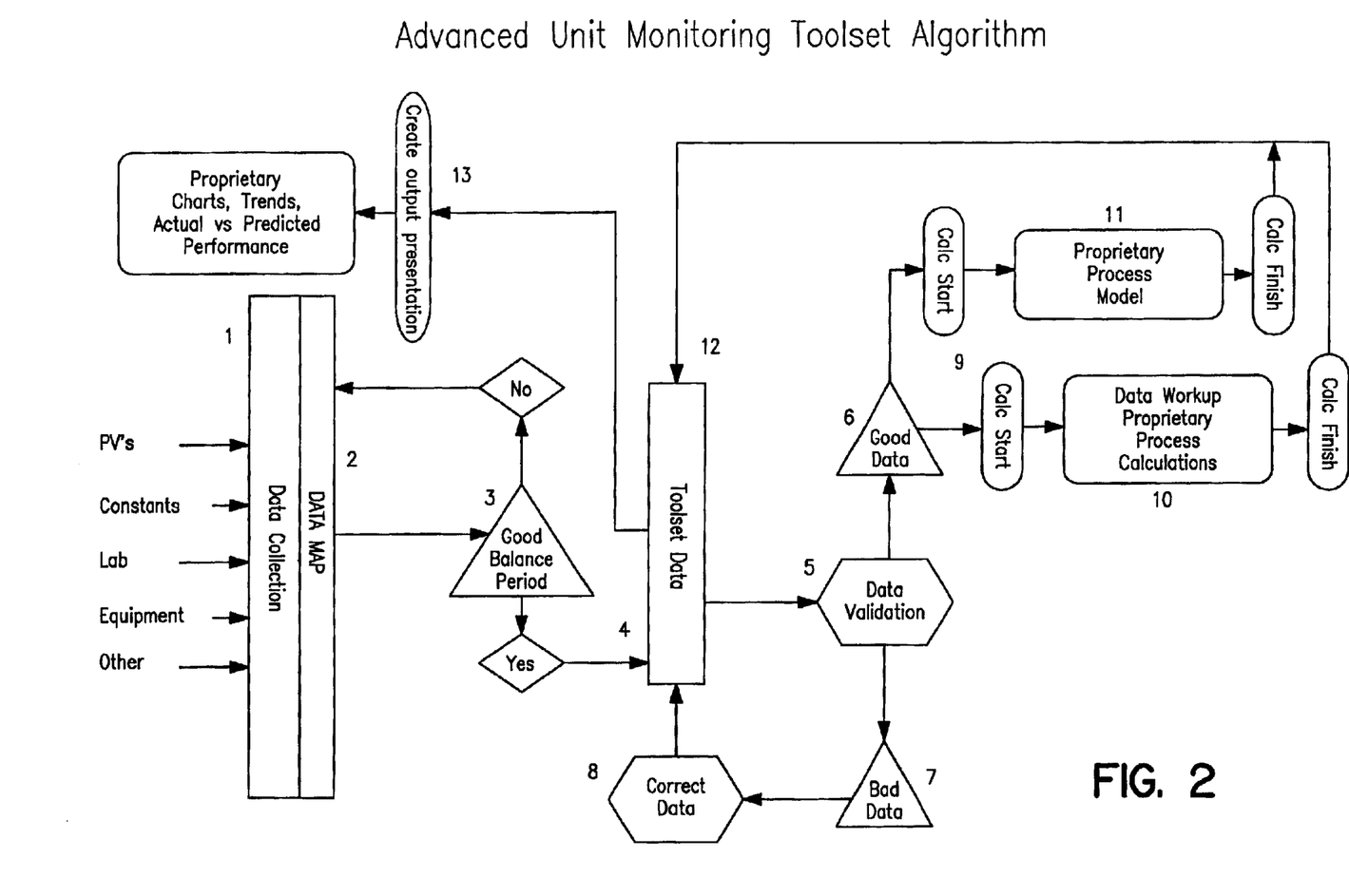
FIG. 2 shows a schematic diagram of the toolset algorithm with the associated interfaces to the database and the calculation modules.

A schematic of the algorithm of the present invention is shown in FIG. 2. The basic steps are data collection (FIG. 2, Step 1), data validation (FIG. 2, Step 6), and data workup (FIG. 2, Step 9).

Data Collection Step

Data collection modules (FIG. 2, Step 1) provide automated data loading from plant information data, Lab analyses, control system stored data and other manually entered data into a Toolset. Where possible, the modules fully automate the loading process thus minimizing user effort required to load data into the Toolset's database. The overall control of the entire process is achieved through the global attribute mapping (FIG. 2, Step 2) kept in the Data Reference Attribute Table. This novel table holds the mapping and transposition master information that identifies how information is collected, transposed and moved throughout the various modules of the Toolset in a way that enables it to be automated and applicable to a wide variety of unit designs.

Each Toolset contains logic set for determining how and when to collect data and this is called a balance period (FIG. 2, Step 3); this is needed as deferring hydrocarbon process units have unique operating modes which require careful consideration when collecting data. For example, certain toolsets will make use of the hourly averages or the entire day averages while other toolsets may prefer to apply a "tight" window around the availability of a lab sample. The former would execute on a known frequency, while the latter would be driven by the availability of thorough feed and product lab samples, as well as the length of time from a unit "upset", the residence time of the unit and possibly the detection of steady state operations. The trigger for data collection can be different for each type of Toolset.

Toolset computations are executed for this "balance period" which is a high quality operating point for the process unit. This may imply different balance period logic for different process units; thus the time window may vary from a fixed time to a variable time. The variable time window could be defined by LAB sample times for feed and product or determined other business practices. Once the time window is determined for the balance point, the Toolset retrieves Average Data. The sample frequency used is the time window PLUS 1-second. This, when combined with a tag reduction type of "Average", returns a single value over any time window (the average is not an arithmetic average but a time-weighted average).

Should a balance period be determined to be bad, the cycle is restarted. If the balance period is good, data is stored as "Toolset Data" in the Process Historian (FIG. 2, Step 4). Monitoring a unit at any given time requires measuring a prescribed set of attributes or properties of the unit at that time. Thus, this realistic time window, called the "balance period", during which most or all of these attributes can be measured or computed, is chosen.

Data Validation Step

With the balance period data now stored back into the Toolset Data in the Process Historian, a data validation step is required (FIG. 2, Step 5). Comprehensive data validation can include completeness, range, checking, comparison with previous operating history, and relationship consistency (e.g., are distillation data points in ascending order, etc.) and is required to insure that high quality data is used for unit monitoring and/or optimization. Data validation also marks suspect data and allows users to define required data such that processing of the subsequent step(s) will not occur with bad or missing data. Three levels of validation may occur:

1. A check that a value is within an acceptable range for different measurements.
2. A check that the value is consistent with other data loaded.
3. A validation that the data for the current balance is reasonable relative to variation expected from recent previous data.

If the data is incorrect, data correction modules (FIG. 2, Step 8 allow users to override the stored input data values. With this data correction, all changes are tracked and linkages to other runs are established as required. The ability to correct data and re-run the Toolset is a very important and adequate logging of changes is critical.

With correct data (FIG. 2, Step 6), either the data workup or process reference models, or both, are started (FIG. 2, Step 9). The Workup Program performs calculations for the balance period in question (FIG. 2, Step 11). These Data Workups for the balance periods are used to analyze unit data for a time window of interest. The balance data is time-stamped with the start date of the chosen time window. Executing a "Data workup for a Balance Period" means that you are requesting that the Toolset program perform a set of calculations for a specific time window and compare the input measurements against those of the output. Each time a set of data is collected, a complete mass and heat balance on the unit is completed, along with a yields workup and a catalyst characterization (if applicable). After the workup is completed, the Toolset program indicates which attributes are input and which are output from the workup. Although all the data in the Balance Period will automatically load all the data from the process data historian, data can be entered manually as well. Each value of the balance period data is entered as an attribute identifying it and a unit identifier. After execution, the user can view the data, create a report, or use it as an input to another tool, such as a detailed process unit model.

When these calculations are finished, the results are sent back as Toolset Data in the process historian (FIG. 2, Step 12). From these results, and the balance period data, charts/graphs and other representations are prepared (FIG. 2, Step 13) to understand the health of the hydrocarbon-processing unit.

Data Workup Step

Data Workup (FIG. 2, Step 11) is a standard, technically sound, and documented set of calculations for the unit. These calculations represent the technology needed for effective unit performance monitoring. This includes detailed performance calculations and summary calculations yielding key performance indicators based on measured process data (temperatures, pressures, flowrates, etc.) laboratory data and equipment design parameters. The Workup may also either prepare data and interface to a model, act completely as the model, or incorporate external model routines within its calculation modules.

Figure 3:
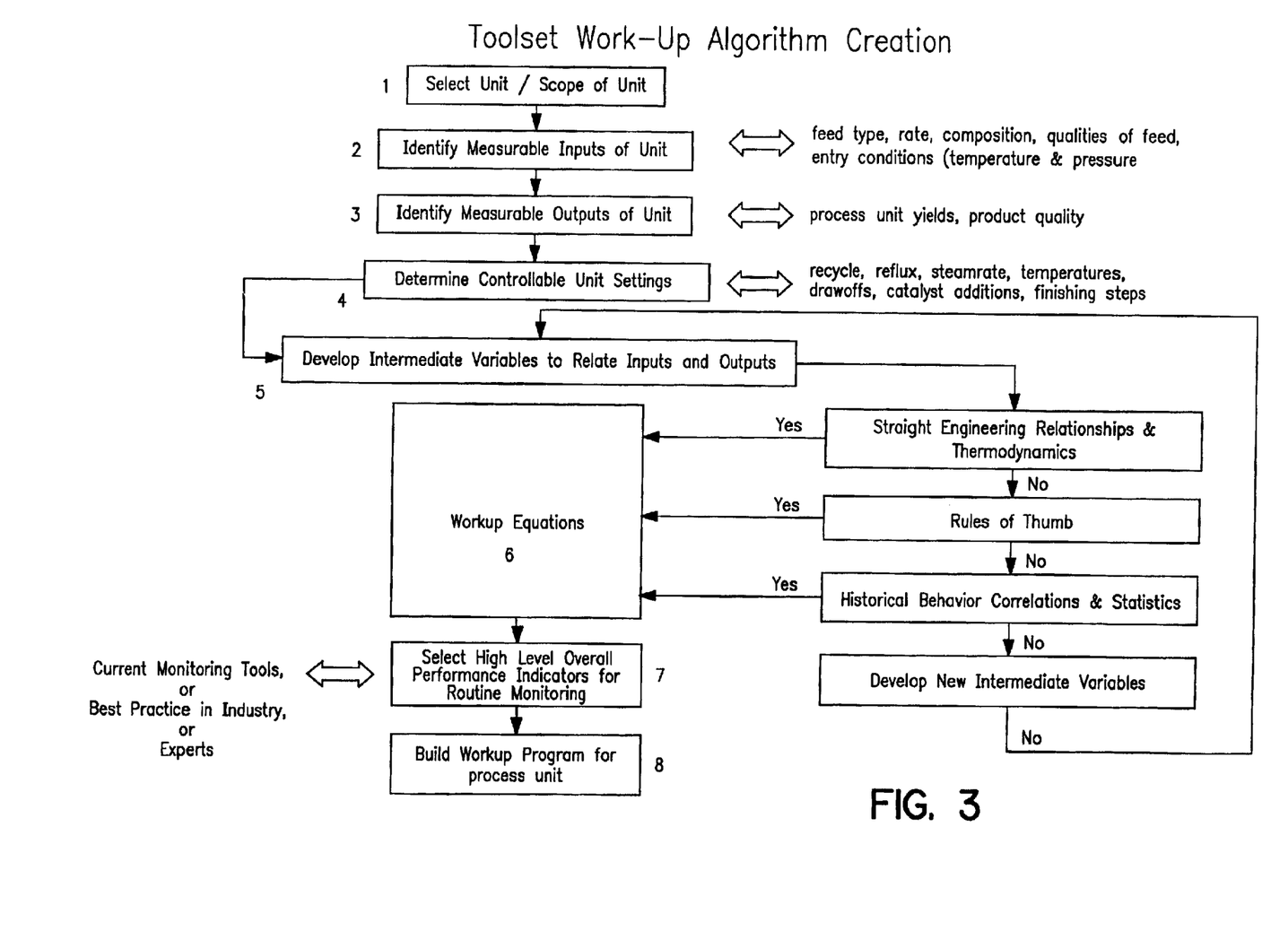
FIG. 3 shows a schematic of the workup calculation module creation
Figure 4:
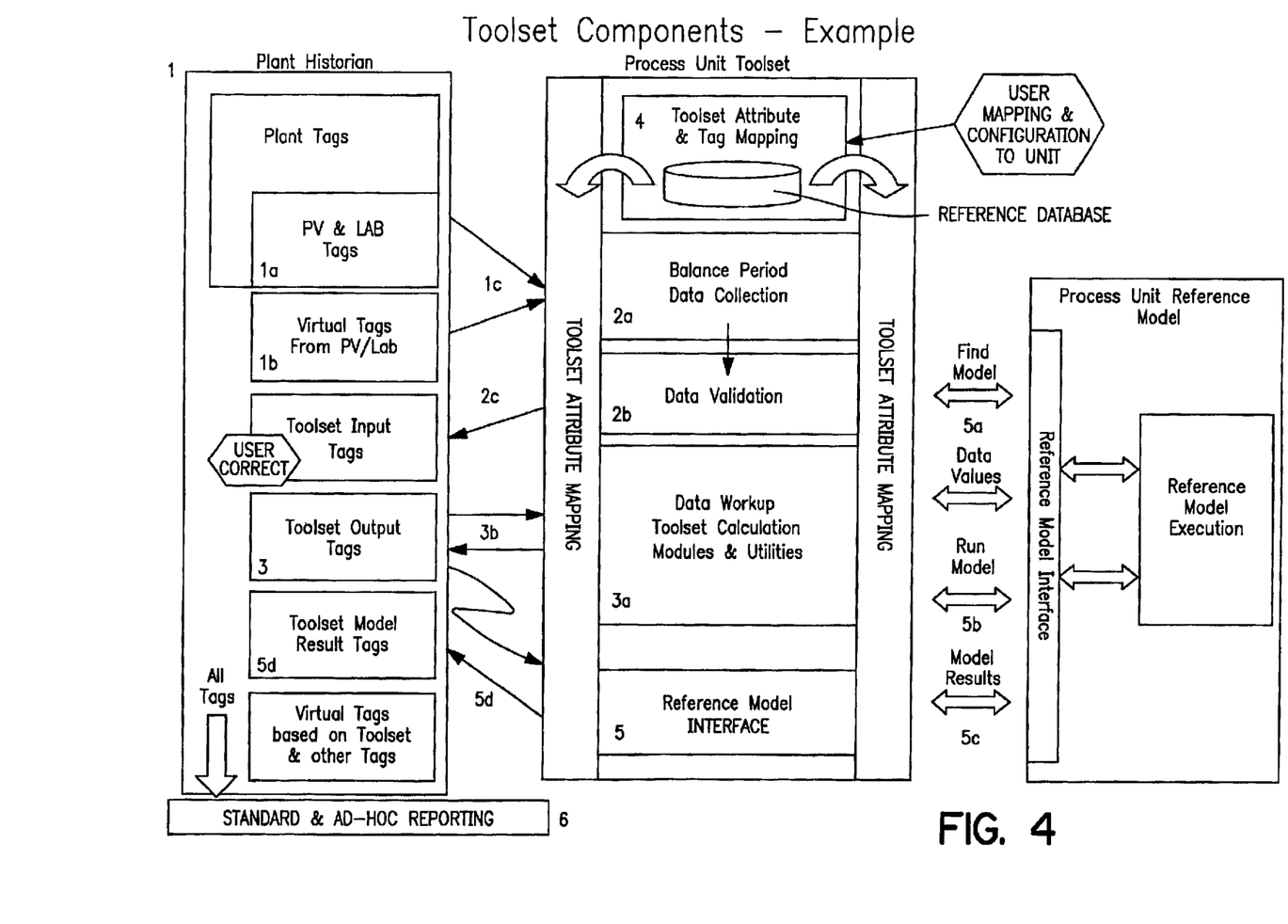
FIG. 4 shows a detailed schematic of how the toolset interfaces with the database, calculation modules and process reference models

Workup procedures typically include the following kinds of computations:

1. Meter corrections to correct raw flow rates. The calculations are based on the measured raw flow rates and stream properties along with meter design information stored in the database.
2. Distillations converted to standard bases (15/5 wt % and LV%) and are stored back in the database.
3. Product streams are blended and a total yield slate is calculated based on standard and user defined cut point bases.
4. One or more flashes are performed to provide fluid properties as input to models or further Workup Workup Development Workup calculations are developed by one skilled in the art to reflect key performance calculations for individual process units and FIGS. 3 and 4 represents how a typical workup program would be developed. In effect, these calculations represent the knowledge base reflecting the experience of expert engineers in running a process unit over time. These can be found in engineering manuals, documents, journals and technical symposia for each Toolset process unit. The development of a workup often requires the cooperation of a team of individuals with skills ranging from process unit domain expertise to instrumentation and measurement expertise, to laboratory analysis experts, to computer program development. In effect, this group of experts forms one skilled in art.

Process Unit Determination

To enable the development of the Data Workup modules, certain parameters, calculations and/or prediction techniques need to be identified. The identification of these key parameters, calculations, and prediction techniques begins with the selection of the process unit (FIG. 3, Step 1). This is an important step since a particular process unit predetermines a number of things about the unit. For example; does the unit have catalyst, does it have particular physical characteristics, does it consume large quantities of utilities (heat, steam, additives, etc), does it have intermediate drawoffs/feeds, where is the instrumentation places, what type of lab samples are taken, etc.

With the particular process unit identified, the next step is to identify the available measurable inputs (FIG. 3, Step 2) and available measurable outputs (FIG. 3, Step 3) for the unit. These measurable values are key since they represent the key volumes/compositions/pressures/temps that enable the unit to be monitored in the base. The measurable inputs are typically plant measurements such as temperatures, pressures and flowrates supplemented by analyzer readings or analysis values from samples taken of the process and sent to a Laboratory. The measurable outputs are the overall results that the experts believe are indicative of the performance of the unit.

Process Unit Settings (FIG. 3, Step 4)

One skilled in the art would now identify the controllable unit settings. These are often the setpoints for the various controls that can be used to adjust the performance of the unit. It is important to know which variables on the unit can be directly adjusted or controlled.

Intermediate Variables (FIG. 3, Step 5)

Next one skilled in the art would now define the unmeasurable but important intermediate variables that are needed to be calculated. Ideally, one would like to have plant measurements for each of these, but the physical reality often does not permit direct measurement or it is too expensive. A good example would be a mixed stream temperature, or a vapor volume fraction, or a flow maldistribution factor or a fluidized bed expansion factor. These unmeasurable items would likely require intermediate prediction or calculation as input to other calculations. The identification of the unmeasurable inputs and outputs would consist of reviewing the unit operations and determining the gaps from the available measures and the specific workup calculations For example; the unit may have blocked operations during which critical intermediate streams are fed into the unit but no measurement of the flowrate is available. This may mean that the flowrate would be assessed to be a constant based upon interpretation of information where the flow was coming from.

Process Unit Workup Calculations (FIG. 3, Step 6)

Next, one skilled in the art would develop equations for critical calculations that would predict the performance of the unit. These equations would result from rules of thumb, publications, historical behavior, engineering relationships or statistics. These could specifically calculate End of Run for Catalyst activity, hydrogen consumption, pressure drops, riser velocities, etc. All would be specific to a given process unit. This development is an iterative process where one selects the intermediate variables, develops workup equations, tests the results, and then improves it by identifying more intermediate variables, researching more computations, etc until an effective data workup is created for that specific type of process unit.

High Level Performance Indicators (FIG. 3, Step 7)

As the last step in the process, one skilled in the art would select the high-level overall performance indicators for routine monitoring of the unit's performance. These are often similar to the controllable unit settings and the measurable outputs but may be more selective and may include some of the intermediate results that clearly indicate performance but may often not be something that can be measured or monitored in a real plant unit (FIG. 4).

Develop Workup Program (FIG. 3, Step 8)

Finally, one skilled in the art would develop the workup program that can be a plug in callable module of the Toolset for that specific type of process unit.

Example of Data Workup

Taking the above to a crude distillation unit as an example, the following shows the above process in more detail Inputs     Column Configuration     Other physical equipment     Feed type or fraction of crude type     Qualities of the feed, Feed Distillation/Assay     Rates     Pressures./temperatures Settings on the Unit     Tower Internals (trays, packing, both)

Recycle (number and location)

Reflux (number and location

Steam Rate

Flash Zone

Draw offs (number and location)

Outputs

Yields of each stream

Qualities of each Stream

Performance Calculations

Tower Hydraulics

Tower Velocities

Tower Loadings

Predicted Qualities

Plant Wide Data Storage and Toolset Performance Database

The Toolset contains two primary data categories that require long term storage:

1. Toolset data values (either collected inputs or computed results) to be stored (FIG. 1, Step 5 and FIG. 2, Step 4).

These data values include all the input measurements (after validation), yields, operational data, yield predictions, process model calibration factors, unit geometry and configurations, and other unit information. It also includes unit monitoring results as well as prediction results, allowing the comparison of predicted and actual results for monitoring of intrinsic unit performance. These data values are stored in the plant history database as plant Tags with a designation that they are Toolset monitoring Tags. This provides a secure long-term history capability and makes the results easily accessible by the suite of tools and applications that exist and are used with the plant history database.

2. Toolset data mapping describing the data attributes to be collected or calculated (FIG. 1, Step 1; FIG. 2, Step 2; FIG. 4, Step 4).

Reference data tables describe each item of data to be stored. This allows each site to properly configure a unit with its requisite number of streams, measurements, etc. Reference data also describe the inputs and outputs of models. The main table in the Toolset reference database is the Unit Attribute Table, which is a list of all the properties of the site's monitored units.

A plant historian (FIG. 1, Step 1a and FIG. 2, Step 1) provides the means to acquire and validate a set of data, and store all the data. All monitoring data will be stored in the plant historian database (Phd) as tag data. There are three types of data:

1. Tag Data (averaged over a Toolset Balance Period) is directly acquired from the process (e.g., temperatures, pressures, flow rates)—this averaged process tag data is referred to as "direct data".

2. Reference Data (Toolset Balance Period start and end times, model parameters and flags used for this time period).

3. Calculated Data is computed using the Data Workup Calculations (e.g., equivalent isothermal temperature) or a process model (e.g., predicted yield).

A plant historian may be any commercial database such as the Honeywell Plant History Database or the Oil Systems Plant Information Database. This plant historian has the ability to store a massive amount of plant data and is highly effective with Timeseries plant data. The commercial historian provides the capability for a program, such as a Toolset, to store all its results. This approach of matching the Toolset to the plant history database have a number of synergy benefits, because the Toolset results are stored in the same place as the plant measures and can be used by users and many other plant applications just as easily as measures. For example, Toolset results can be read by control programs and optimizers, results can be part of operations monitoring and target exception reporting, results can be sent to the operators and used in automated alerting/paging systems. Once the results are stored in the Phd, the door is open for a new generation of capabilities.

Typical Toolset Example—The Powerforming Toolset

FIG. 4 shows a schematic diagram of the relationship between the toolset, process historian, calculation modules and process reference model. This example explains the data flow in the Powerforming, which is for catalytic reforming to improve octane.

Collect Raw Plant Data: FIG. 4, Step 1

Raw plant data is automatically collected and stored in the plant historian (FIG. 4, Step 1a) (in this case, Honeywell Process History Database PHD is used). All lab data (FIG. 4, Step 1a) is available and stored in the plant historian as well. Should any data need to be averaged from process data or lab data, this would also come from the Process Historian in the form of Virtual Tags (FIG. 4, Step 1b). Lastly, all Toolset input data would come from the plant historian (FIG. 4, Step 1c).

Raw Plant Data Validation: FIG. 4, Step 2

The Toolset will automatically pull data (FIG. 4, Step 1c) from Phd for a time period (balance period) determined by the site (FIG. 4, Step 2a). The Toolset can be scheduled to run at any frequency depending on data availability and need.

All data inputs to calculation programs will be extracted from Phd and validated (FIG. 4, Step 2b). The raw data will be low/high range checked and all data falling out of range will be automatically flagged and substituted with a default value. The engineer reviews all data that falls out of range before the calculations are run and in most cases, the engineer accepts the default value. Validated data is stored back into the process historian (FIG. 4, Step 2c).

Valid Low/High values for each Toolset input will be stored in a Reference Table. The Reference Table stores all site-specific information about the Powerformer and is critical for providing a means to distinguish one type of Powerformer form another (ie Cyclic versus Semi-Cyclic).

Powerformer feed samples are collected at a regularly scheduled time and feed lab analysis is performed. The Toolset requires this lab data to perform a material balance and other calculations. In plant operations, it is not uncommon for the lab to analyze the feed later than the scheduled time sometimes this delay can be a day or more. An automated Toolset running on a daily basis makes decisions when yesterday's lab data is unavailable for today's calculations. Thus, the Toolset will perform calculations using the last available set of lab data. In the case of unavailable lab data, the plant historian returns the previously stored value (i.e., yesterday's lab results) so that the calculations can proceed. For Powerformers, this approach works well since the Powerformer feed does not change significantly on a day to day basis. All substituted or assumed values are clearly indicated on all output reports. The engineer may rerun balances for those periods in question when the correct lab data is available General Powerforming Data Workup on Valid Data: FIG. 4, Step 3

Once balance period data is validated and stored back into the plant historian Data Workup calculations are performed (FIG. 4, Step 3a). All of the general calculations currently to currently monitor a Powerformer are included in the Powerformer toolset. These include Catalyst Activity Monitoring calculations). For each type of hydrocarbon processing unit, there is a unique set of calculations that are used to perform performance monitoring. Each Toolset utilizes that existing calculation set as a module to perform the needed computations. For any given type of process unit, one skilled in the art can develop the needed performance monitoring calculations for use by the Toolset and shown in FIG. 3 and discussed in this document.

The Toolset performs all calculations in English units and with the plant historian is able to display the results in units customary to that location.

The Toolset will perform a material balance. This uses an eight hour time window centered around when the lab samples are normally taken. Hourly data points, for each input variable, are averaged to get the value to use for the material balance calculation. If all of the data is not available for the material balance calculation, then the material balance calculation is skipped and is noted on a daily execution log. Therefore, the material calculation frequency corresponds with the lab analysis frequency.

The material balance outputs and the general calculation outputs are stored (FIG. 4, Step 3b) back into the plant historian (FIG. 4, Step 3) as Toolset output Tags. A copy of the validated Toolset inputs is also stored in the plant historian to facilitate changing incorrect data in the Toolset.

Run a Powerformer Kinetic Model and Store Key Results Back into Phd: FIG. 4, Step 5

The Powerformer kinetic model(s) is specially designed this process. These models are not part of the Toolset and are commercially available from a number of vendors. The Toolset, because of its mapping of attributes, has the ability to drive information into the model (FIG. 4, Step 5a) tell the model to execute (FIG. 4. Step 5b), and then extract the model results back into the Toolset (FIG. 4, Step 5c), for storage back into the process historian (FIG. 4, Step 5d). The Toolset also provides non-automated capability to run kinetic model cases based on actual plant data to obtain a predicted yield to compare against a measured yield. Further it is possible to automatically schedule these model cases to run on a daily basis.

In the above example, the Kinetic model was run in a forward prediction mode; however, a model written in an open form, can be run in many different modes with different and uniquely important results. In this way, the Toolset can utilize a model in prediction or optimizing modes. The forward prediction mode simply takes the inputs to the process unit and predicts the yields based on the feed composition, operating conditions and unit/catalyst status. The Toolset monitoring can both assess how the unit is behaving, how it should behave and how it potentially could behave if adjusted for optimal performance. Thus the monitoring could identify missed opportunity.

Step 6: Graphs of Unit Performance: FIG. 4, Step 6

Powerformer data is best viewed graphically in the form of XY plots. These plots convey the current state of the system when the data was collected. In Powerformer terms, this means that the plots need to indicate which reactors are on-oil or which reactor is regenerating (off-oil).

After the calculations have been run, the Toolset provides the plots that are essential for determining the health of the unit. A core set of these plots are used to determine the health of the unit. If everything looks good with these plots, the unit is healthy. The plot descriptions below provide a brief explanation of how to use the plots to assess unit health.

1. Stabilizer Bottoms Lab Research Octane Number (RON) vs. Date—An important and well-known measured parameter in reforming is Research Octane Number (RON). RON is reformate product specification (when used for mogas blending). The engineer checks this plot each day to ensure that the unit's final product meets spec. Sites that use reformate to feed a chemical plant may have another target specification. For these sites, a target chemical specification is plotted.

2. Measured $C_5+$, $H_2$ Yields vs. Date—The most direct measure of unit health, but usually the most inaccurate since several flow meter measurements are required. The engineer will compare the measured yield to predicted yields from the kinetic model. Large predicted minus measured yield deltas indicates a potential unit health problem or a bad flow measurement. In either case, action is required.

3. Catalyst Activity vs. Date—Is an overall measure of the ability of the unit to upgrade the low octane feed into high-octane products. The activity correlation is a good measure of overall system health because it accounts for day to day variations in feed quality, product octane, unit pressure and temperature.

4. Total Corrected Unit Temperature Drop vs. Date—This plot looks at the sum of the temperature differences between the reactor inlets and outlets. A "corrected" temperature drop signifies that the observed temperature drop has been recalculated based on a standard recycle gas ratio, recycle gas hydrogen purity, and feed naphthenes content. This correction dampens variations in the temperature drop caused by changes in such items as recycle gas ratio. The thermocouples are the eyes of the unit and indicate changes in unit performance quickly.

5. Individual Reactor 50% point vs. Date—These plots look at the fraction of the temperature drop that occurs in the top 50% of the catalyst bed of each reactor. These plots indicate the condition of the catalyst at the top of each catalyst bed (since the top of the bed is affected by a feed upset/contamination sooner than the rest of the bed). These plots also indicate the reactor's 50% point when it is placed in service and one of the reactors is removed.

6. Overall Catalyst Deactivation vs. Date—Overall catalyst deactivation correlates with the average coke level on the catalyst. This plot is useful to determine if the regen frequency is sufficient to prevent a long-term coke build-up.

7. Recycle Gas Hydrogen Purity vs. Date—The hydrogen content of the recycle gas is a significant indicator of process performance. Changes in hydrogen purity reflect variations in catalyst activity or process severity Step 7: Write Daily Output Report to the Engineer's Computer: FIG. 4, Step 6

The Cyclic/Semi-Cyclic Toolset provides three reports
The key features of the reports are summarized below:

1. The Toolset will provide the engineer with an enhanced version of the reports on a more frequent basis (daily versus every 7–10 days) and with less required effort.
2. Plots—The Toolset will provide plots of key performance on a regular basis. These are likely the first thing that the contact would look at in the morning to ensure that the unit is healthy. Additional plots are also available, if the engineer notices a potential problem with the unit. The engineer will also have the capability to generate additional ad-hoc plots quickly and easily.
3. 2–3 Page Summary Report—The Toolset will provide a simplified 2–3 page tables report containing the most critical information about the unit. The simplified 2–3 page report contains a section on all substitutions made for data that fell outside pre-determined valid ranges. The report also contains a section containing predicted kinetic model yields.

What is claimed is:

1. A method to monitor and analyze the performance of a petroleum processing unit comprising:
   (a) collecting historical data relating to an oil refinery unit from a process history database;
   (b) performing a workup to determine the output measurements, wherein said historical data comprises process data, including temperatures, pressures, flow rates and catalyst loadings, start and stop dates of the last workup; and
   (c) storing the results of said workup in said process history database.

2. The method of claim 1 further comprising the step of validating said historical data.

3. The method of claim 2 wherein said data validation step includes filtering, damping, averaging, statistical, principle component analysis or process runs rules as a way to automatically set the bounds for validation.

4. The method of claim 1 further comprising the step of correcting said data.

5. The method of claim 1 wherein said historical data includes stored data or calculated data from said process history database.

6. The method of claim 1 farther comprising the step of putting the results of said workup into a process model for said petroleum processing unit to compute the performance of the unit.

7. The method of claim 6 wherein said method compares workup results to a process model results to compare actual, predicted, and optimal operation.

8. The method of claim 6 wherein said model can be executed more than once at different conditions or different model modes in which to determine an optimum operating point.

9. The method of claim 6 further comprising the step of using the data in said process history database for assessment of the accuracy of the model and more exact tuning of the model.

10. The method of claim 1 wherein said performing step is carried out by using calculation programs.

11. The method of claim 1 wherein a Global attribute Mapping Reference Table which contains the definition and master control information to identify how every variable is collected, transposed, moved through the method and stored.

12. The method of claim 11 further comprising the step of configuring the method for different petroleum processing units.

13. The method of claim 1 wherein said method includes the determination of a special balance window to define the appropriate starting and ending time window to be used for the workup and the process model for each execution of the method.

14. The method of claim 13 further comprising the step of comparing laboratory and analytic data to the process data.

15. The method of claim 13 wherein said balance window can be defined by an analysis of unit operations to identify a period of time of operation of the process at steady state.

16. The method of claim according to any one of claims 1–14 wherein the results of said work up stored in said process history database may be accessed by other methods used in said petroleum processing unit.

17. The method of claim 1 wherein said workup is stored in calculation modules which are made up of reusable workup sub-modules that can be shared by calculation modules of many different process units.

18. The method of claim 1 wherein said petroleum processing unit is a distillation unit and said workup is performed by using equations that relate to a distillation unit, including blending of feeds of different crude types, calculations of flash zone performance, hydraulic performance of tower sections, and hydrotreating.

19. The method of claim 1 wherein said petroleum processing unit is a hydrotreating unit and said workup is performed by using equations that relate to a hydrotreating unit, including catalyst performance and activation, hydrogen purity and others.

20. The method of claim 1 wherein said petroleum processing unit is a catalytic cracking unit and said workup is performed by using equations that relate to a catalytic cracking unit, including bed fluidization, catalyst circulation, catalyst additions, cracking estimations, catalytic cracking emissions and regeneration and others.

21. The method of claim 1 wherein said petroleum processing unit is a lubes unit and said workup is performed by using equations that relate to lubricating oil units, including extract and raffinate efficiency, composition impacts of qualities such as wax, additive use, and performance limits that impact qualities and others.

22. The method of claim 1 wherein said petroleum processing unit is a reforming unit and said workup is performed by using equations that relate to a reforming unit, including catalyst performance, recycle gas quantity and quality, regeneration effectiveness, and others.

23. The method of claim 1 wherein said performing step is carried out by including equations in the data workup that relate to the petroleum processing unit.

* * * * *